Patented June 20, 1950

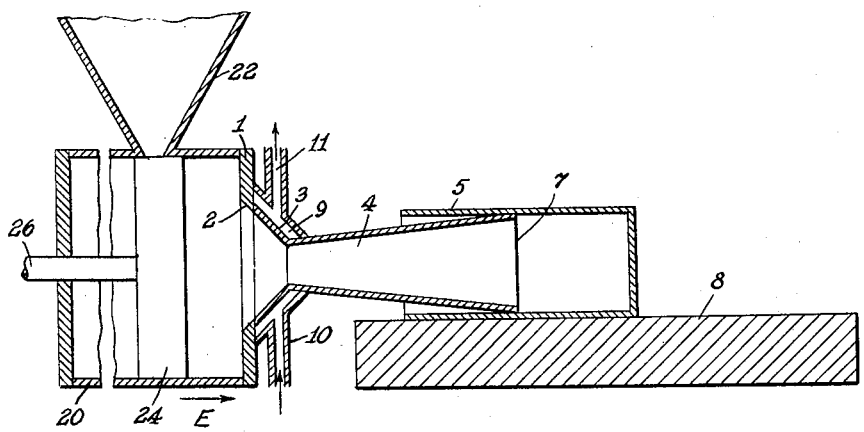

2,512,506

UNITED STATES PATENT OFFICE 2,512,506

METHOD OF PREPARING ARTIFICIAL SPONGES

René L. Saint-Denis, Beauvais, France, assignor, by mesne assignments, to Societe Novacel, Paris, France, a corporation of France Application June 24, 1947, Serial No. 756,585
In France July 2, 1946

1 Claim. (Cl. 18—48)

This invention relates to artificial sponges. More particularly, it relates to a new and improved method of and apparatus for producing artificial sponges.

In one process for the manufacture of artificial sponges, a plastic or pasty sponge-forming composition, comprising a cellulose solution such as viscose intimately mixed with fibrous materials and pore-forming substances such as soluble or fusible crystalline substances, was appropriately molded in the form of blocks. The blocks were coagulated in the mold and, after coagulation, the molded materials were appropriately treated in the known manner.

In another process, the sponge-forming composition was extruded under high pressure into a tubular mold of the desired cross-section. The molded material, after removal from the mold, was coagulated and treated in the usual manner. The blocks or extruded material may be sectioned prior to coagulation.

United States Patent 2,116,611 discloses that, in a process of molding the sponge-forming composition by means of piston presses in which the nozzle of the extrusion press is provided with a nose in the shape of a truncated cone to provide a certain constriction of the extruded material, which may be either a rod (circular in cross-section) or a bar (rectangular in cross-section), the extruded material is highly oriented in the axial direction and, irrespective of whether the extruded material is coagulated in the mold and subsequently severed or the extruded material is removed from the mold, severed and coagulated, the final artificial sponge has an oriented structure and a considerably greater strength in the axial direction than in the transverse direction. This axial strength is not useful since the sponge is subjected to only slight forces in such direction when utilized, particularly for washing and cleaning.

United States Patent 2,116,611 further discloses that artificial sponges having substantially the same breaking strength in all directions can be obtained by cutting the molded blocks or extruded bars across the grain of orientation into sections prior to coagulation, and subjecting the sections to pronounced deformation by pressure in the same general direction as the grain of orientation, preferably perpendicular to the cut sections. This procedure for disorientating the structure involves additional operations which are not only laborious and costly but additionally produces small blocks, which complicates handling.

United States Patent 2,332,955 discloses a method wherein the extruded material is passed through a twisted nose and thereafter the mass is coagulated, subjected to the usual treatments, and finally severed into the desired lengths. This procedure is efficacious but it produces a new unilateral orientation due to the asymmetrical form of the nose.

An object of this invention is to provide a new and improved method of making artificial sponges.

Another object of this invention is to provide a method for making artificial sponges having the same strength along their three axes.

Other and additional objects will appear hereinafter.

The objects of the invention are accomplished, in general, by providing an extrusion press with a nozzle having a passage of decreasing cross-section followed by a passage of increasing cross-section. As a consequence, when the sponge-forming composition leaving the press passes through the passage of decreasing cross-section, it will be constricted and when it passes through the passage of increasing cross-section, it will expand and its cross-section will be enlarged.

The constricting passage may be in the form of a truncated cone or truncated pyramid. The expanding passage can also be either in the form of a truncated cone or truncated pyramid. Alternatively, the expanding portion can consist of a prismatic or cylindrical portion followed by a flared portion, such as a truncated cone or pyramid. In the preferred form, the delivery end of the expanding passage is of a cross-section of substantially the same shape and size as the mold into which the sponge-forming composition is extruded.

In practice, a tubular mold, which is approximately the same length as that of the expanding passage, is disposed completely on the latter whereupon the sponge-forming composition is extruded directly into the mold which, as it fills, receives a progressive retrograde motion. The mold is preferably disposed on a slightly inclined bed of such length so that, when the mold is filled, the delivery end of the expanding passage will leave said mold and the filled mold will be supported on the bed in position to permit severing of the mass between the mold and delivery end of the expanding passage.

The filled mold is removed and a new mold disposed on the expanding passage. The molded material is then processed in the known manner. Means are provided to facilitate the extrusion of the composition from the press.

The present invention will be more clearly understood by reference to the following detailed description when taken in connection with the accompanying drawing, in which the single figure is a vertical section of an apparatus embodying the principles of this invention.

Referring now to the drawing, the reference numeral 20 designates an extrusion press chamber provided with a feed hopper 22 through which the sponge-forming composition is introduced into the press. A piston 24, slidably disposed in the chamber 20, is carried at one end of a piston rod 26, the other end of which is adapted to be actuated in order to provide sliding movement in either direction in the chamber 20. Any means can be utilized for imparting the sliding movement to the piston 24 and, since the precise means therefor constitutes no essential part of this invention, further description thereof is deemed unnecessary.

In one embodiment, the piston 24, at the end of its extruding stroke (as indicated by the arrow E), serves to close the outlet of the supply hopper 22 and thereby interrupt the feed of the sponge-forming composition. Upon being retracted, the piston 24 will open the outlet of the supply hopper 22 and permit feeding of the sponge-forming composition to the press. It is to be understood that the feed of the sponge-forming composition through the hopper may be continuous or that a predetermined amount may be introduced thereby.

The front wall 1 of the press chamber 20 is provided with an opening 2 through which the sponge-forming composition is extruded from the press. This opening is provided with a nozzle 3 which is in the form of truncated cone or pyramid. At its smallest end, the nozzle 3 is provided with an extension 4 which flares in the direction of the passage of the sponge-forming material therethrough. It is apparent that upon the extrusion stroke of the piston 24, the sponge-forming composition will be extruded from the press successively through the nozzle 3 and into and through the extension 4. When the mass passes through the nozzle 3, it will be constricted and when the constricted material passes through the extension 4, it will expand and increase in cross-section.

The sponge-forming composition, as it leaves the extension 4, is delivered in a tubular mold 5 which has been disposed on the extension 4. As shown, the cross-section of the delivery end 7 of the extension 4 is of approximately the same shape and size as the cross-section of the mold 5. The extension 4 preferably is also of a length approximately the same as the external length of the mold 5. For reasons which will become apparent, the mold 5 is slidably disposed on a slightly inclined bed 8.

In operation, the mold 5 is positioned completely on the extension 4. After the sponge-forming composition has been introduced into the press through the hopper 22, the piston 24 is actuated to extrude the sponge-forming composition from the press into the mold 5. As the sponge-forming composition 6 is being delivered into the mold 5, the latter is given progressive retrograde motion on the slightly inclined bed 8. When the mold is full, i. e. when the delivery end of the extension 4 leaves the mold, the filled mold will be supported by the bed 8, at which time the mass is cut, for example, with a knife, removed from position, and another mold is disposed on the extension 4, and the operation repeated. The molded mass is coagulated in the mold and, after removal, subjected to the known finishing operation. It is, of course, to be understood that the feed of the sponge-forming composition and actuation of the piston 24 are such as to permit the molding operation to be carried out in the timed sequence described.

Because of the extension 4, considerable time for the filling of a mold is required. This time can be reduced by heating the nozzle 3 and, preferably also, the juncture thereof with the extension 4. In the form shown, this is obtained by a jacket 9, provided with an inlet 10 and outlet 11, whereby a heating medium, such as hot water or other fluid, is circulated. A loosening is thus effected which facilitates the extrusion of the composition. Sponges obtained by transversely severing the herein produced molded mass after coagulation, washing, etc. show, when subjected to mechanical tests in the wet condition, a strength of 1.6 to 1.7 kilograms per square centimeter along their three axes, while sponges produced by methods not utilizing the invention show, when tested under the same condition, a strength of 1.8 to 2 kilograms per square centimeter in the direction of the feed, and a strength of 1.4 to 1.5 kilograms per square centimeter transverse to the feed.

The nozzle 3 can be in the shape of a truncated cone or truncated pyramid, and the dimensions thereof may vary according to the diameter of the extruded bar or rod, the consistency and composition of the sponge-forming composition, the temperature, etc. Its length may be, for example, of the order of 2 to 10 centimeters, and the angle of the passage may be, for example, 10° to 60°, giving rise to a constriction of 5% to 25%. The extension 4, which can be in the shape of a truncated cone or truncated pyramid, may be of a length of the order of 10 to 50 centimeters, and the angle of its passage may be, for example, 5° to 10°, giving rise to an increase in cross-section of from 20% to 100%.

If desired, the extension 4 can consist of a prismatic or cylindrical portion followed by a flaring portion which can be in the shape of a truncated cone or pyramid. In all cases, the delivery end of the extension is of a cross-section similar to that of the tubular mold.

Though the invention has been described in connection with a piston press, it is to be understood that it can be utilized in connection with any appropriate extrusion press, screw press, piston press or the like, provided the pressure is sufficient to impart a very compact texture to the composition. The pressure should preferably be of the order of 80 to 100 milligrams per square centimeter.

Since it is obvious that various changes and modifications may be made in the above description without departing from the nature or spirit thereof, this invention is not restricted thereto except as set forth in the appended claim.

I claim:

In a method of preparing homogeneously strong artificial sponges having the same breaking strength along their three axes and wherein the artificial sponge-forming composition is extruded from a nozzle into a mold surrounding the nozzle, the step which comprises forcing the artificial sponge-forming composition in its passage from the nozzle to the mold successively through a passage of decreasing cross-section and a passage of gradually increasing cross-section, said last passage being of substantially the same length as the mold and terminating in a discharge orifice of substantially the same cross-sectional shape and area as the mold, whereby the composition is gradually expanded to the area of the mold while being constrained by said last passage and by the mold and fills the mold without undergoing change in form, and retracting the mold as the composition is extruded in response to the pressure exerted by the extruded material until the mold has been filled, and severing the extruded material between said discharge orifice and said mold.

RENÉ L. SAINT-DENIS.

REFERENCES CITED

The following references are of record in the file of this patent:

UNITED STATES PATENTS

| Number | Name | Date |
| --- | --- | --- |
| 873,559 | Koontz | Dec. 10, 1907 |
| 1,598,201 | Koppitz | Aug. 31, 1926 |
| 2,116,611 | Vautier et al. | May 10, 1938 |
| 2,245,608 | Rogers | June 17, 1941 |
| 2,329,239 | Banigan | Sept. 14, 1943 |
| 2,332,829 | Parsons et al. | Oct. 26, 1943 |